(12) United States Patent
Hasegawa et al.

(10) Patent No.: US 7,963,488 B2
(45) Date of Patent: Jun. 21, 2011

(54) STAND FOR A THIN DISPLAY

(75) Inventors: Kenichi Hasegawa, Hadano (JP); Seiji Matsui, Sagamihara (JP)

(73) Assignee: NEC Display Solutions, Ltd., Tokyo (JP)

( * ) Notice: Subject to any disclaimer, the term of this patent is extended or adjusted under 35 U.S.C. 154(b) by 1206 days.

(21) Appl. No.: 11/331,304

(22) Filed: Jan. 12, 2006

(65) Prior Publication Data

US 2006/0175476 A1  Aug. 10, 2006

(30) Foreign Application Priority Data

Jan. 14, 2005  (JP) .................................. 2005-007293

(51) Int. Cl.
*F16M 11/14* (2006.01)
(52) U.S. Cl. ..................... 248/183.2; 248/919; 248/920; 361/679.21
(58) Field of Classification Search .................. 248/919, 248/920, 679.05, 679.06, 679.07, 679.21, 248/679.22, 679.23, 679.24, 679.25, 183.2; 74/417, 606 R; 361/679.05, 679.06, 679.07, 361/679.21, 679.22, 679.23, 679.24, 679.25
See application file for complete search history.

(56) References Cited

U.S. PATENT DOCUMENTS

| 6,189,842 | B1 * | 2/2001 | Gull et al. ................... 248/125.1 |
| 6,874,743 | B2 * | 4/2005 | Watanabe et al. .......... 248/276.1 |
| 7,336,478 | B2 * | 2/2008 | Jang .............................. 361/681 |
| 7,458,546 | B2 * | 12/2008 | Jang .............................. 248/161 |
| 7,490,796 | B2 | 2/2009 | Kim |

FOREIGN PATENT DOCUMENTS

| CN | 1734680 A | 2/2006 |
| EP | 0 989 479 B1 | 3/2000 |
| JP | 11-7250 | 1/1999 |
| JP | H11-153961 | 6/1999 |
| JP | 2003-185088 | 7/2003 |
| JP | 2004-70279 | 3/2004 |
| JP | 2004-078073 | 3/2004 |
| WO | WO2004/019308 | * 3/2004 |

OTHER PUBLICATIONS

Japanese Official Action dated Jan. 4, 2011, together with a partial English-language translation.

* cited by examiner

*Primary Examiner* — Gwendolyn W Baxter
(74) *Attorney, Agent, or Firm* — Scully, Scott, Murphy & Presser, P.C.

(57) ABSTRACT

A stand for a thin display includes a vertical position adjustment mechanism; and a switchover mechanism for switching over between a vertical orientation and a horizontal orientation of a thin display. When the switchover mechanism has rotated the thin display, the vertical position adjustment mechanism has different movement ranges between the vertical orientation and the horizontal orientation. Accordingly, when the thin display is in a vertical orientation, the lower end of the thin display does not hit against a base, which provides a easy and reliable operation even in a vertical orientation or in a horizontal orientation.

6 Claims, 10 Drawing Sheets

STAND FOR A THIN DISPLAY

PRIORITY CLAIM

Priority is claimed on Japanese Patent Application No. 2005-007293, filed with the Japanese Patent Office on Jan. 14, 2005, the content of which is incorporated herein by reference.

BACKGROUND OF THE INVENTION

1. Field of the Invention

The invention relates to a thin display such as a liquid crystal monitor, and particularly to a stand for a thin display having a display screen raising-and-lowering mechanism and a rotary changeover mechanism for changing over between a vertical orientation in which a screen of the thin display is longer in a vertical direction and a horizontal orientation in which the screen is longer in a horizontal direction.

2. Description of Related Art

Recently, a thin display such as and a liquid crystal display and a plasma display has been widely used as a monitor for a personal computer and a television. The thin displays are supported by a stand and provided with a vertical position adjustment mechanism for adjusting a vertical position according to the height of the eyes of a user. In addition, the thin displays contain a changeover mechanism for changing over between a vertical orientation and a horizontal orientation by rotation. For the related art with regard to a stand for a thin display, see, for example, Japanese Patent Publication No. 2003-185088.

However, the thin-display stand of the prior art had no relationship between a vertical position adjustment mechanism and a rotary changeover mechanism, each of which worked independently. FIG. 10 shows one example in which a thin display 1 is represented by the solid line and supported by a pedestal 2 in a vertical orientation. When the thin display 1 is in a horizontal orientation, even if the screen of the thin display 1 is lowered to the lowest position X, the screen does not hit against a table or a base. However, when the screen of the thin display 1 is in a vertical orientation as shown in FIG. 10 and is lowered by the length X, there is a problem that the screen hits against a table or a base. This situation is not able to guarantee easy and reliable operation irrespective of a vertical orientation or a horizontal orientation. Accordingly, there is a need to solve the problem mentioned above.

SUMMARY OF THE INVENTION

The invention is directed to a stand for a thin display, or a thin-display stand that satisfies the need. The thin-display stand interlocks a vertical position adjustment mechanism and a changeover mechanism and provides easy and reliable operation even in a vertical orientation in which a screen of the thin display is longer in a vertical direction or in a horizontal orientation in which the screen is longer in a horizontal direction.

One aspect of the invention relates to a stand for a thin display. The stand for a thin display comprises a vertical position adjustment mechanism; and a switchover mechanism for switching over between a vertical orientation and a horizontal orientation of a thin display, wherein when the switchover mechanism has rotated the thin display, the vertical position adjustment mechanism has different movement ranges between the vertical orientation and the horizontal orientation.

Advantageously, the stand for a thin display further includes a stopper which appears or disappears according to a rotation of the thin display, wherein the stopper changes the movement ranges of the vertical position adjustment mechanism.

Advantageously, the stand for a thin display further includes a gear mechanism, wherein the stopper is controlled to appear or disappear by the gear mechanism.

Advantageously, the stand for a thin display further includes a flexible joint, wherein the stopper is controlled to be appeared or disappeared by the flexible joint.

Preferably, the thin display includes a rotational axis about which the stopper is rotated.

Preferably, the movement ranges of the vertical position adjustment mechanism are altered by the stopper that varies according to a rotational movement of the thin display.

Another aspect of the invention is directed to a stand for a thin display. The stand for a thin display comprises a thin display including a screen and a low depth, the screen having a long side and a short side; a vertical position adjustment unit for adjusting a vertical position of the thin display; and a rotary switchover unit for switching over the thin display between a vertical orientation and a horizontal orientation, the vertical orientation being a position in which the long side is in a vertical direction, the horizontal orientation being a position in which the long side is in a horizontal direction, wherein when the rotary switchover unit has rotated the thin display, the vertical position adjustment unit has different movement ranges between the vertical orientation and the horizontal orientation.

Since the invention, which is constructed as described above, has the following advantages.

According to the invention, a stand for a thin display comprises a vertical position adjustment mechanism; and a switchover mechanism for switching over between a vertical orientation and a horizontal orientation of a thin display, wherein when the switchover mechanism has rotated the thin display, the vertical position adjustment mechanism has different movement ranges between the vertical orientation and the horizontal orientation. Therefore, the lower end of the thin display does not hit against a table even when the thin display is in a vertical orientation, which is able to provide a comfortable and reliable operation even when the thin display is in a vertical orientation or in a horizontal orientation. In addition, it is possible to provide a thin-display stand that effectively functions in terms of eronomics.

According to the invention, a stand for a thin display further comprises a stopper which appears or disappears according to a rotation of the thin display, wherein the stopper changes the movement ranges of the vertical position adjustment mechanism. Consequently, interlocking with a movement to put the thin display in a vertical orientation does not project the stopper or limit a lowest point, so that the lower end of the thin display is blocked by a block. As a result, even if the thin display is in a vertical orientation or in a horizontal orientation, a comfortable and reliable operation can be obtained.

According to the invention, a stand for a thin display further comprises a gear mechanism, wherein the stopper is controlled to appear or disappear by the gear mechanism. Therefore, switching over between a horizontal orientation and a vertical orientation automatically alters vertical adjustment ranges.

According to the invention, a stand for a thin display further comprises a flexible joint, wherein the stopper is controlled to be appeared or disappeared by the flexible joint. As a result, switching over between a horizontal orientation and a vertical orientation automatically alters vertical adjustment ranges, and an alternation mechanism for the adjustment ranges can be simplified.

Since the stopper is rotated about a rotational axis of the thin display, an alternation mechanism for the vertical adjustment ranges can be simplified.

Because the movement ranges of the vertical position adjustment mechanism are altered by the stopper that varies according to a rotational movement of the thin display, a movement range of the stopper can be made smaller to make compact an alternation mechanism of the vertical adjustment mechanism.

Because the movement range of the vertical position adjustment mechanism is made smaller when the thin display is in a vertical orientation than when the thin display is in a horizontal orientation, the lower end of the thin display does not strike against a table even when the thin display is in a vertical orientation. An easy and reliable operation can be obtained even when the thin display is in a horizontal orientation.

DETAILED DESCRIPTION OF THE INVENTION

Figure 1:
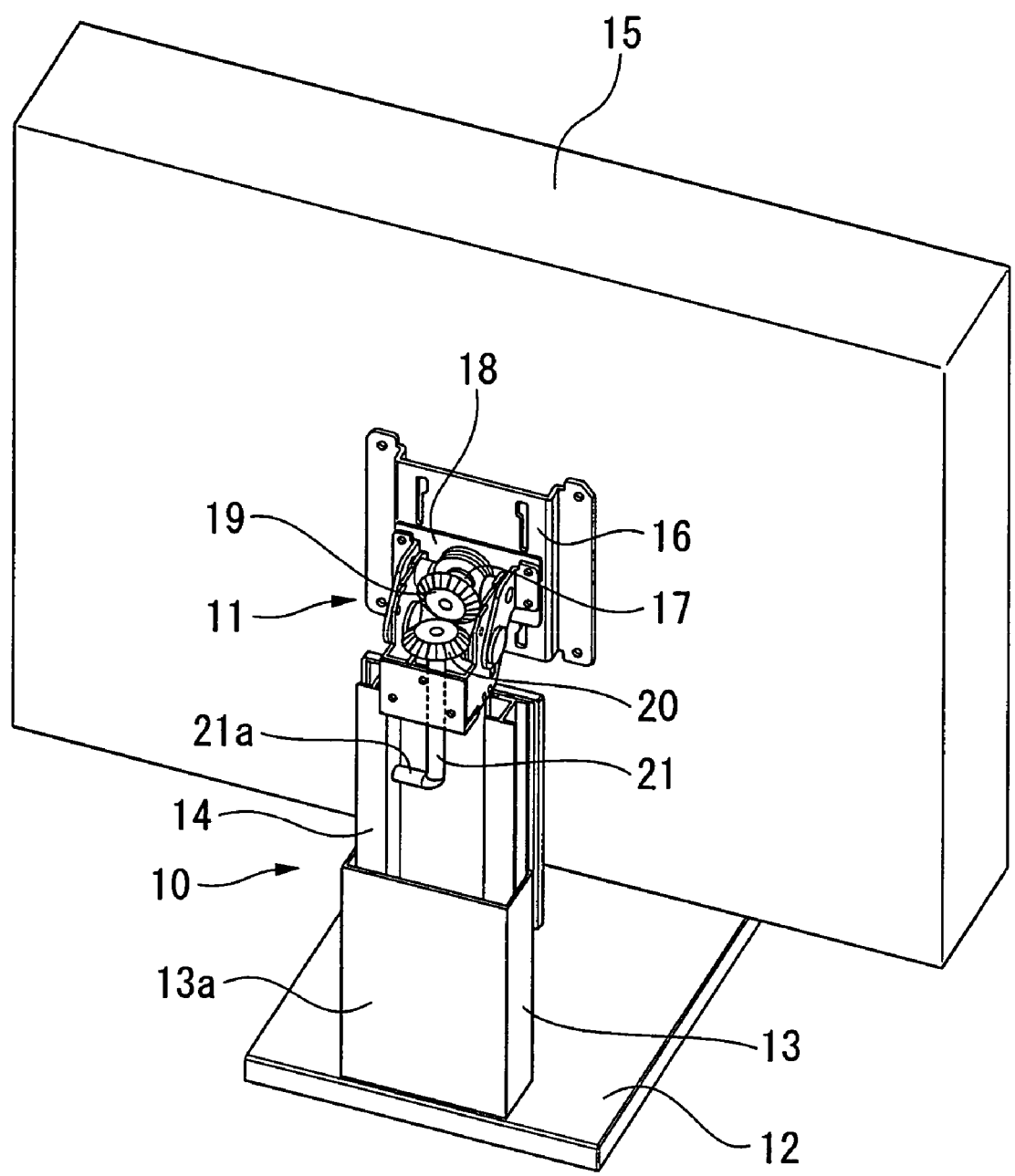
FIG. 1 is a perspective view of a thin-display stand in a horizontal orientation of a first embodiment in accordance with the invention.
Figure 2:
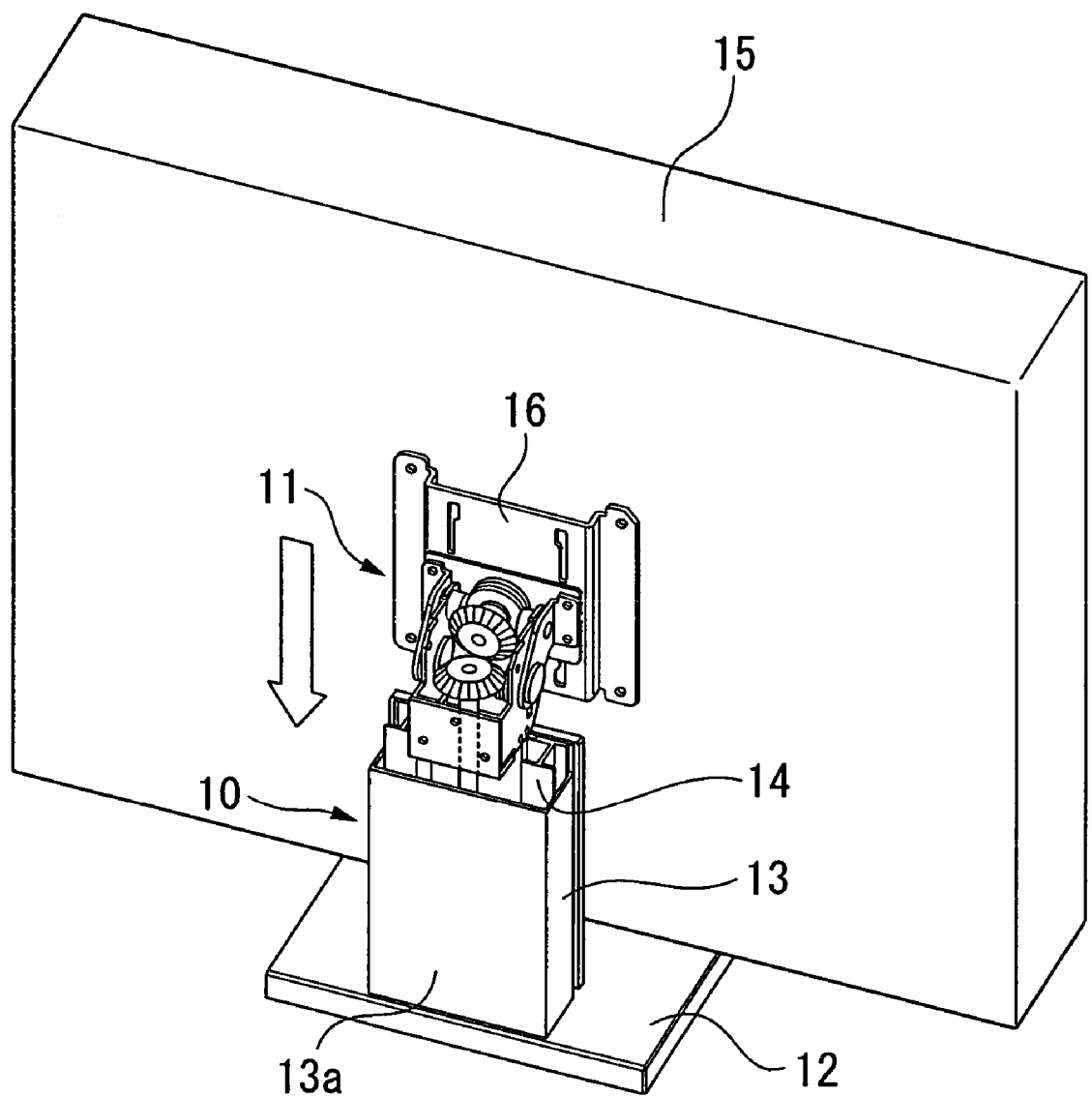
FIG. 2 is a perspective view of the thin-display stand in a state when the thin-display stand is lowered at a lowest position.

Referring to the figures, the invention will be described in detail. FIG. 1 is a perspective view of a stand for a thin display or a thin-display stand in a horizontal orientation of a first embodiment in accordance with the invention. FIG. 2 is a perspective view of the thin-display stand in a state when the thin-display stand is lowered at a lowest position. The thin-display stand includes a vertical position adjustment mechanism 10 and a changeover mechanism 11 for changing over between a vertical orientation in which a display screen 15 of the thin display is longer in a vertical direction and a horizontal orientation in which the display screen 15 is longer in a horizontal direction.

The vertical position adjustment mechanism 10 includes a support member 13 provided on a stand base 12 and a slide member 14 slidably mounted inside the support member 13.

The slide member 14 can move up or down in a predetermined range. On the top of the slide member 14 is mounted the changeover mechanism 11 that can switch over between a horizontal orientation and a vertical orientation.

The changeover mechanism 11 contains a hold plate 18 for rotatably holding a mount axis 17 without restriction fixed on a mount plate 16 mounted on the back side of the display screen 15 by a screw, a first bevel gear 19 fixed on the tip of the mount axis 17, a second bevel gear 20 positioned orthogonal to the first bevel gear 19, and a stopper member 21 for rotatably supporting the second bevel gear 20.

The mount plate 16 is always in contact with the hold plate 18, which constitutes a contact plane. The display screen 15 rotates by 90 degrees about the mount axis 17 in a plane parallel to the contact plane, which changes over between the vertical orientation and the horizontal orientation. An oval hole 22, which is concentric with the mount axis 17, is formed in a range of 90 degrees in the mount plate 16. A pin (not shown) that is inserted and moves in the oval hole 22 extrudes from the hold plate 18. Accordingly, the display screen 15 can be rotated by 90 degrees only in a predetermined direction. A stopper piece 21a of the stopper member 21 is bent at an angle of almost 90 degrees. When the display screen 15 is in a horizontal orientation as shown in FIGS. 1 and 2, it is almost parallel to a wall 13a of the support member 13.

Figure 3:
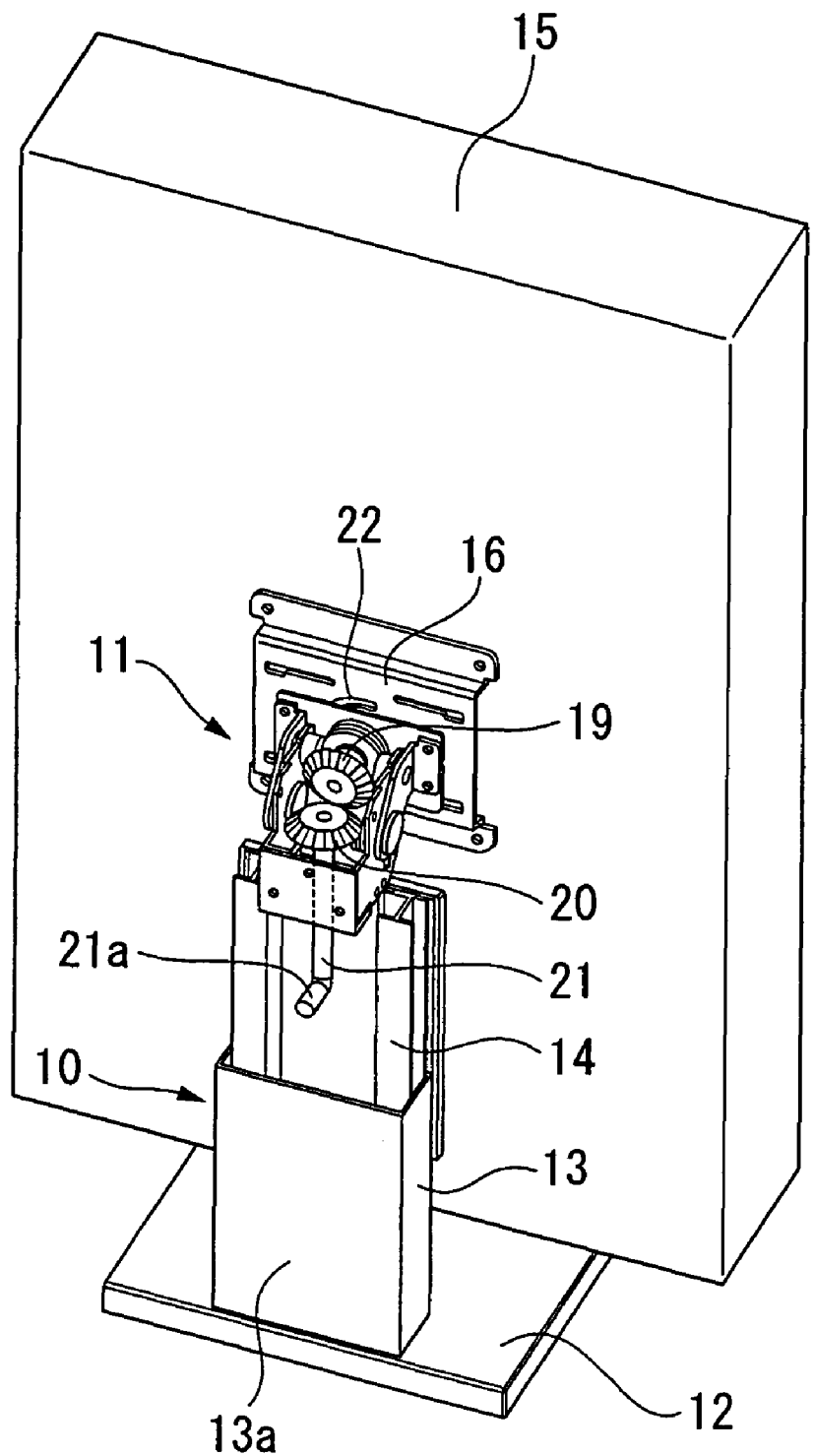
FIG. 3 is a perspective view of the thin-display stand in a vertical orientation.
Figure 4:
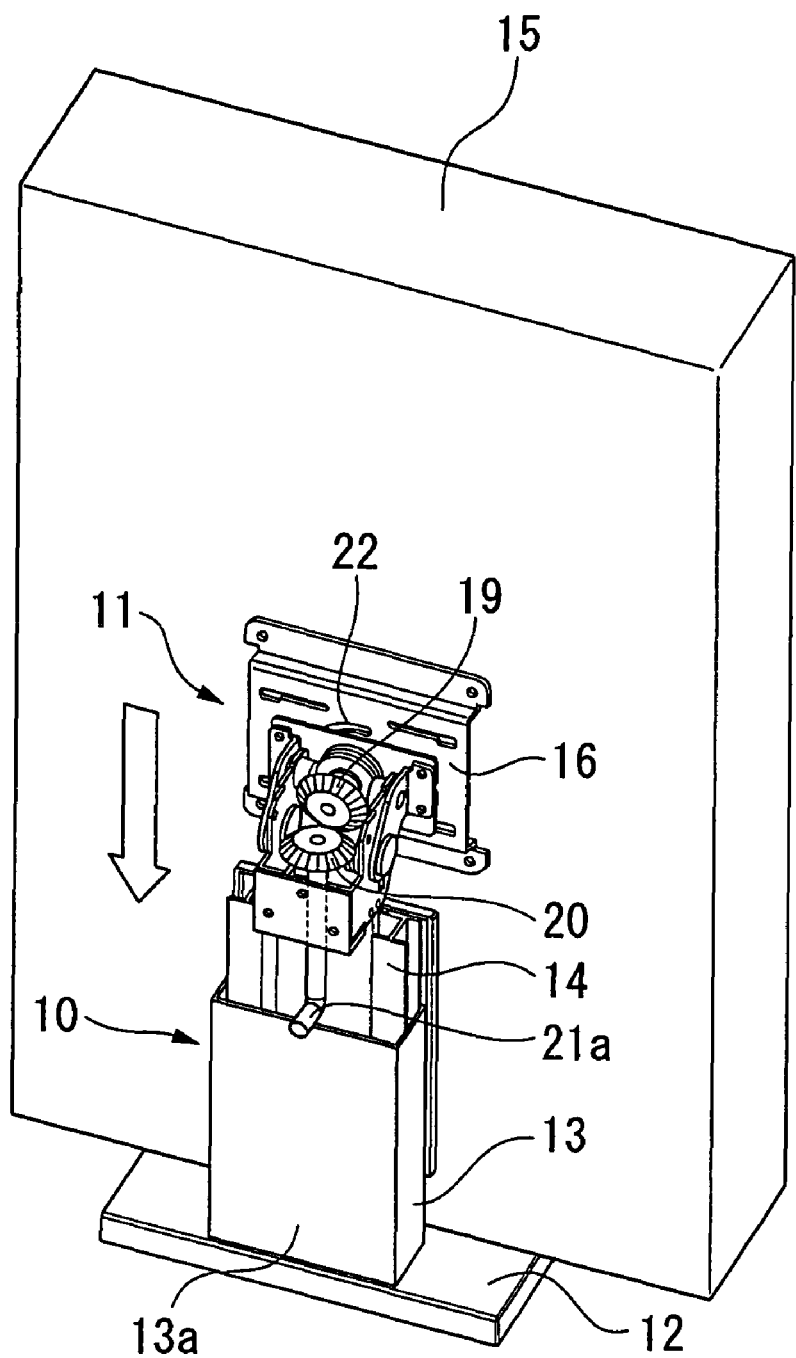
FIG. 4 is a perspective view of the thin-display stand in a state when the thin-display stand is lowered at a lowest position.

FIG. 3 is a perspective view of the thin-display stand in a vertical orientation. FIG. 4 is a perspective view of the thin-display stand in a state when the thin-display stand is lowered at a lowest position. When the display screen 15 is in a vertical orientation after rotated by 90 degrees as shown in FIG. 3, the rotation is transferred to the stopper member 21 via the first and second bevel gears 19 and 20. The stopper 21, as shown in FIGS. 3 and 4, is rotated by 90 degrees to be positioned away from the wall 13a of the support member 13.

The function of the thin display stand constructed as described above will be described. When the display screen 15 is in a vertical orientation as shown in FIG. 1, because the stopper piece 21a of the stopper member 21 is almost parallel to the wall 13a of the support member 13, the lower end of the display screen 15 can move down to the lowest portion of the vertical position adjustment mechanism 10 as shown in FIG. 2. Even when lowered to the lowest portion, the lower end of the shorter side of the display screen 15 does not hit against the base stand or a desk surface.

When the display screen 15 is rotated by 90 degrees to be in a vertical orientation as shown in FIG. 3, the stopper piece 21a is projected because the first and second bevel gears rotate the stopper member 21 by 90 degrees. When the vertical position adjustment mechanism 10 is lowered with the stopper piece 21a projected, the stopper piece 21a hits against the upper end of the support member 13 to limit further downward movement as shown in FIG. 4. Therefore, the lower end of the longer side of the display screen 15 never hits against the stand base 12 or a desk surface.

In this way, depending on which orientation the display screen 15 is in—a vertical orientation or a horizontal orientation—according to the invention, a range of upward and downward movement by the vertical position adjustment mechanism 10 is automatically decided. For this reason, in spite of either a vertical orientation or a horizontal orientation, an easy and reliable operation can be obtained.

In place of the first and second bevel gears 19 and 20 as means for converting rotational directions, a wire or belt can be employed.

Figure 5:
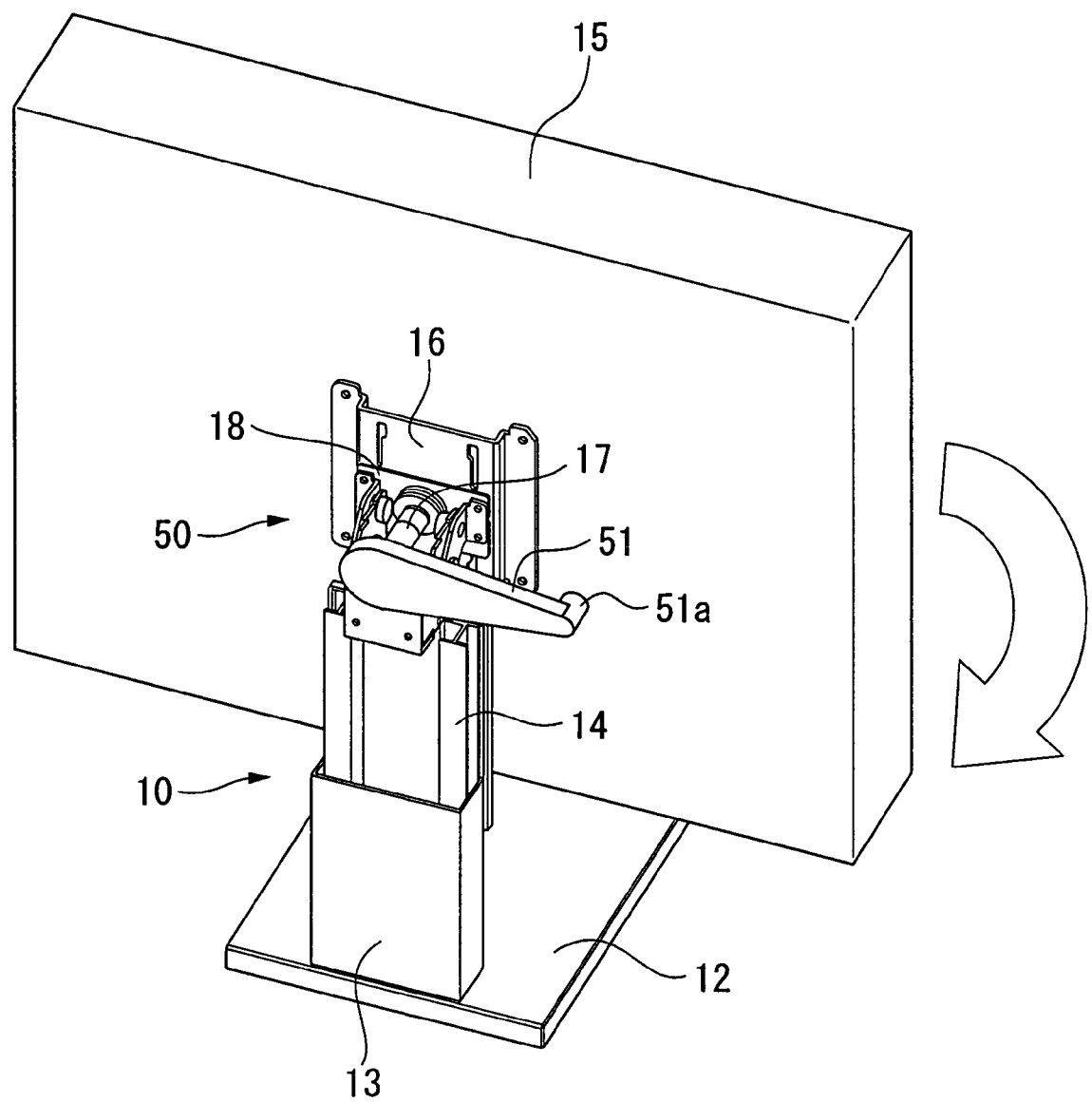
FIG. 5 is a perspective view of a thin-display stand of a second embodiment in accordance with the invention.

FIG. 5 is a perspective view of a thin-display stand of a second embodiment in accordance with the invention. In the embodiment, a switch over mechanism 50 includes the hold plate 18 for rotatably holding the mount axis 17 without restriction fixed on the mount plate 16 mounted on the back side of the display screen 15, a stopper arm 51 fixed on the tip of the mount axis 17, and a stopper projection 51 formed on the tip of the stopper arm 51.

As in the first embodiment, the mount plate 16 is in contact with the hold plate 18, which constitutes a contact plane. The display screen 15 is rotated by 90 degrees about the mount axis 17 in a plane parallel to the contact plane, which changes over between a vertical orientation and a horizontal orientation. The oval hole 22, which is concentric with the mount axis 17, is formed in a range of 90 degrees on the mount plate 16. A pin (not shown) that is inserted and moves in the oval hole 22 extrudes from the hold plate 18.

The stopper arm 51 extends almost horizontally when in a horizontal orientation shown in FIG. 5. Accordingly, the tip of the stopper projection 51a never hits against the upper end of the support member 13. However, when the display screen 15 is rotated by 90 degrees to be in a vertical orientation, the stopper arm 51 is also rotated by 90 degrees to position the stopper projection 51a upright.

When a thin display stand constructed as described above is in a vertical orientation as shown in FIG. 5, the display screen 15 can be moved to the lowest portion of the vertical position adjustment mechanism 10 because the stopper arm 51 is located horizontally. Even when lowered to the lowest portion, the lower end of the short side of the display screen 15 does not strike against the stand base 12 or a desk.

Figure 6:
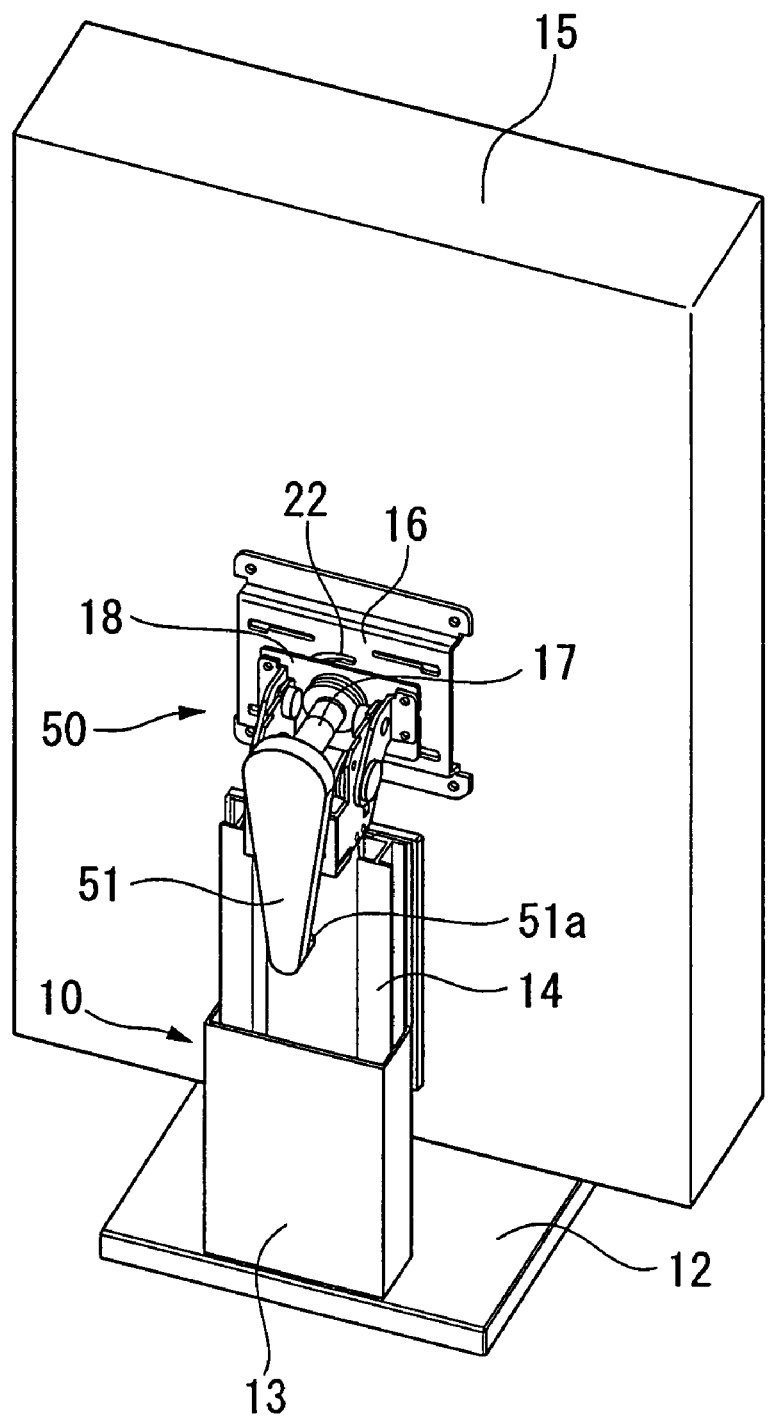
FIG. 6 is a perspective view of the thin-display stand in a horizontal orientation.

FIG. 6 is a perspective view of the thin-display stand in a horizontal orientation. As shown in FIG. 6, when the display screen 15 is rotated by 90 degrees to be in a vertical orientation, the stopper arm 51 is also rotated by 90 degrees to move the stopper projection 51a to a position right above the support member 13. When the vertical position adjustment mechanism 10 is lowered maintaining this state, the stopper projection 51a strikes against the top end of the support member 13, which prevents further downward movement by the vertical position adjustment mechanism 10. Accordingly, the lower end of the longer side of the display screen 15 never hits against the stand base 12 or a table. In this way, also in this embodiment, the condition that the display screen 15 is in either a vertical orientation or a horizontal orientation automatically determines a range of upward and downward movement of the vertical position adjustment mechanism 10.

Figure 7:
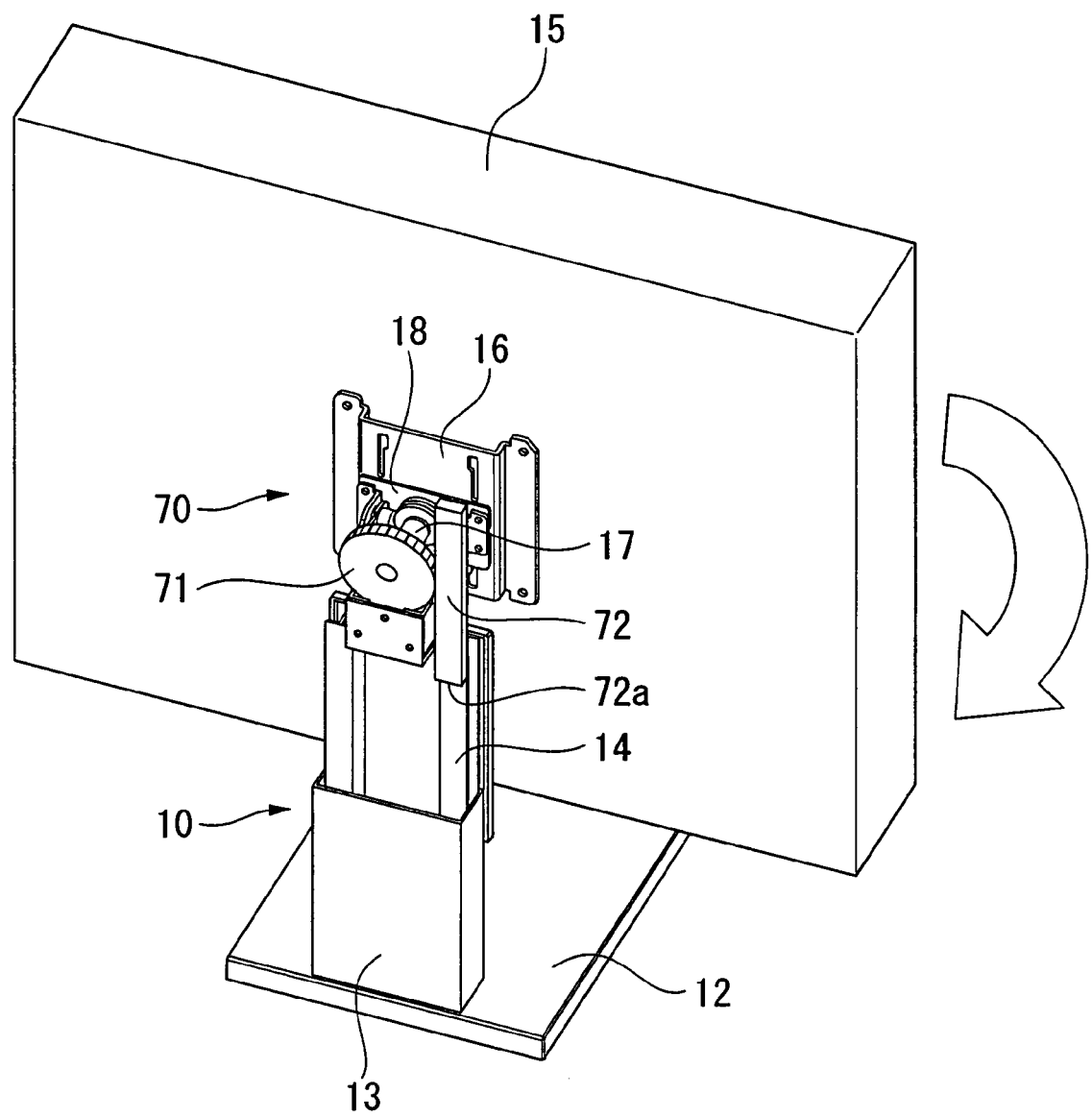
FIG. 7 is a perspective view of a thin-display stand of a third embodiment in accordance with the invention.

FIG. 7 is a perspective view of a thin-display stand of a third embodiment in accordance with the invention. In the embodiment, a changeover mechanism 70 includes the hold plate 18 for rotatably holding the mount axis 17 without restriction fixed on the mount plate 16 mounted on the back side of the display screen 15 by a screw, a pinion gear 71 fixed on the tip of the mount axis 17, and a rack gear 72 engaging the pinion gear 71.

The pinion gear 71 rotates with the display screen 15. The rack gear 72 is slidably held by the slide member 14 of the vertical position adjustment mechanism 10. Consequently, with the rotation of the display screen 15, the rack gear 72 moves up or down along the slide member 14. As in the first embodiment, the hold plate 18 is always in contact with the mount plate, which forms a contact plane. The display screen 15 rotates by 90 degrees about the mount axis 17 in a plane parallel to the contact plane to change over between a vertical orientation and a horizontal orientation. The oval hole 22 concentric with the mount axis 17 is formed in an arc having 90 degrees in the mount plate 16. A pin (not shown) that is inserted in the oval hole 22 protrudes from the hold plate 18.

With respect to the thin-display stand constructed as described above, when in a horizontal orientation shown in FIG. 7, since a lower end 72a of the rack gear 70 is located at a higher position, the display screen 15 can move to almost a lowest position of the vertical position adjustment mechanism 10. At this time, the lower end of the shorter side of the display screen 15 does not hit against the stand base 12 or a table.

Figure 8:
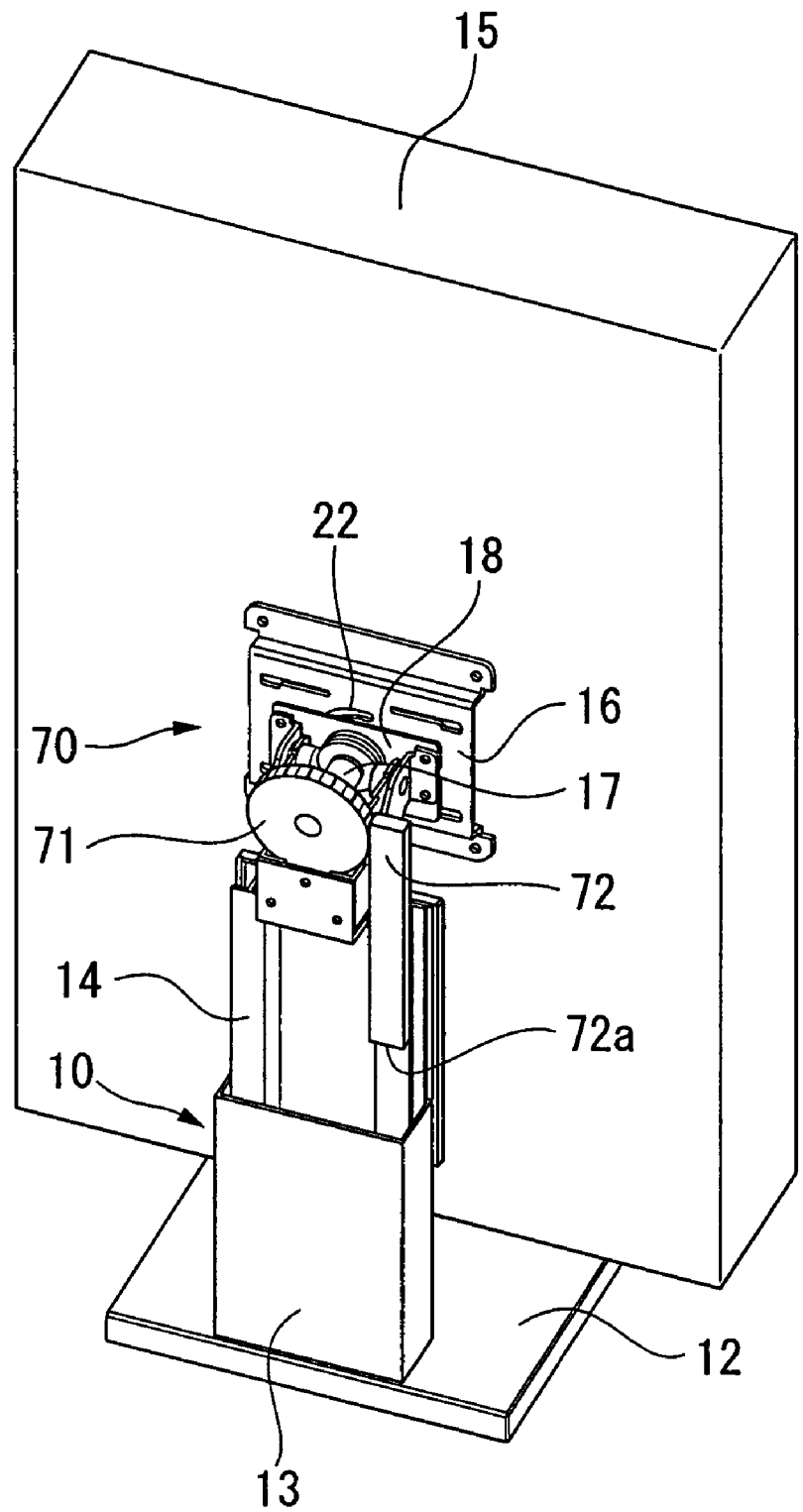
FIG. 8 is a perspective view of the thin display stand in a vertical orientation.

FIG. 8 is a perspective view of the thin-display stand in a vertical orientation. As shown in FIG. 8, in a case where the display screen 15 is rotated by 90 degrees to be in a vertical orientation, the pinion gear 71 is also rotated by 90 degrees, which lowers the lower end 72a of the rack gear 72. When the vertical position adjustment mechanism 10 is lowered maintaining the situation, the lower end 72a of the rack gear 72 hits against the top end of the support member 13, which limits a further downward movement. Hence the lower end of the longer side of the display screen 15 never strikes against the stand base 12 or a table.

Figure 9:
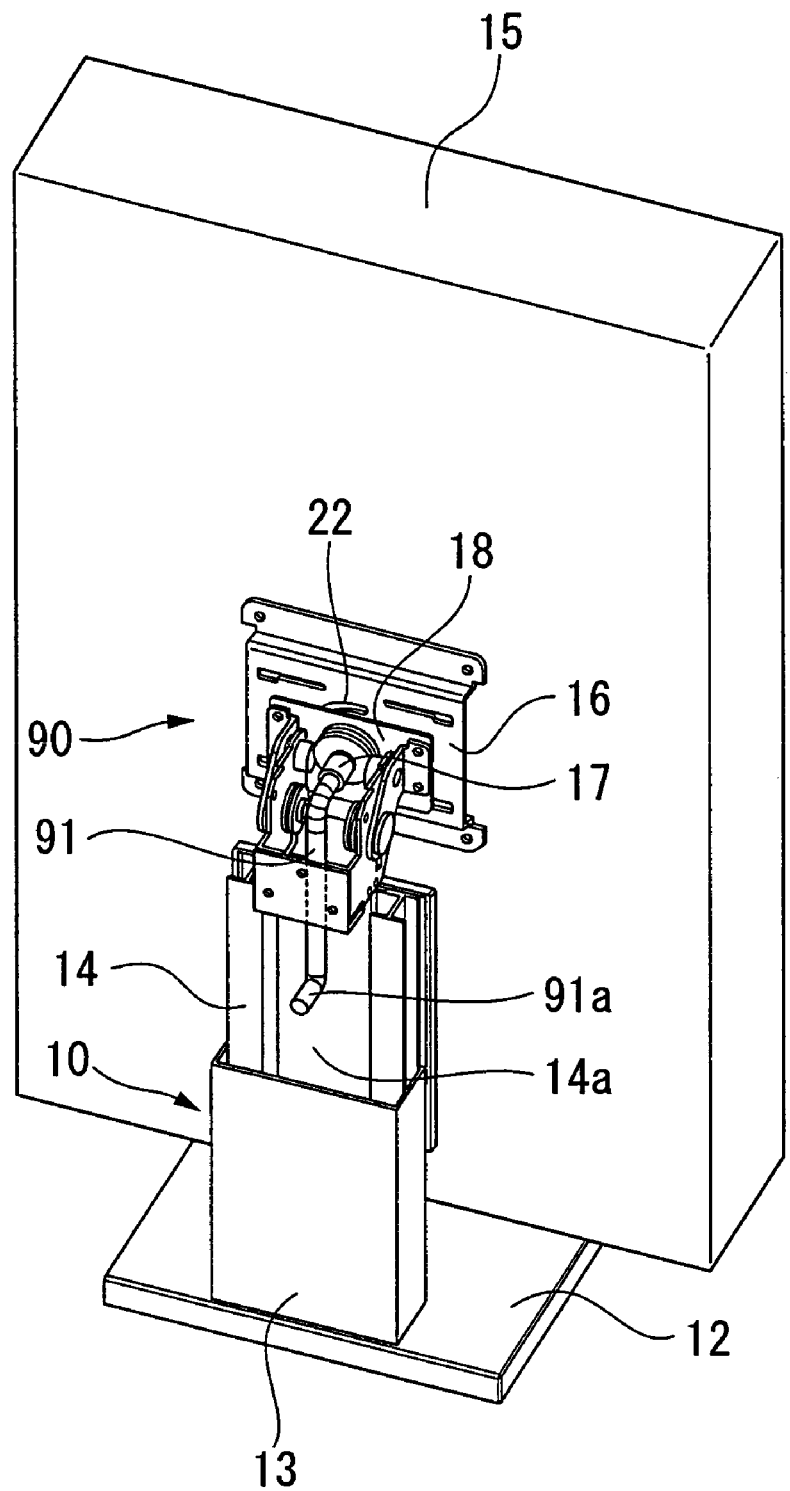
FIG. 9 is a perspective view of a thin-display stand of a fourth embodiment in accordance with the invention.
Figure 10:
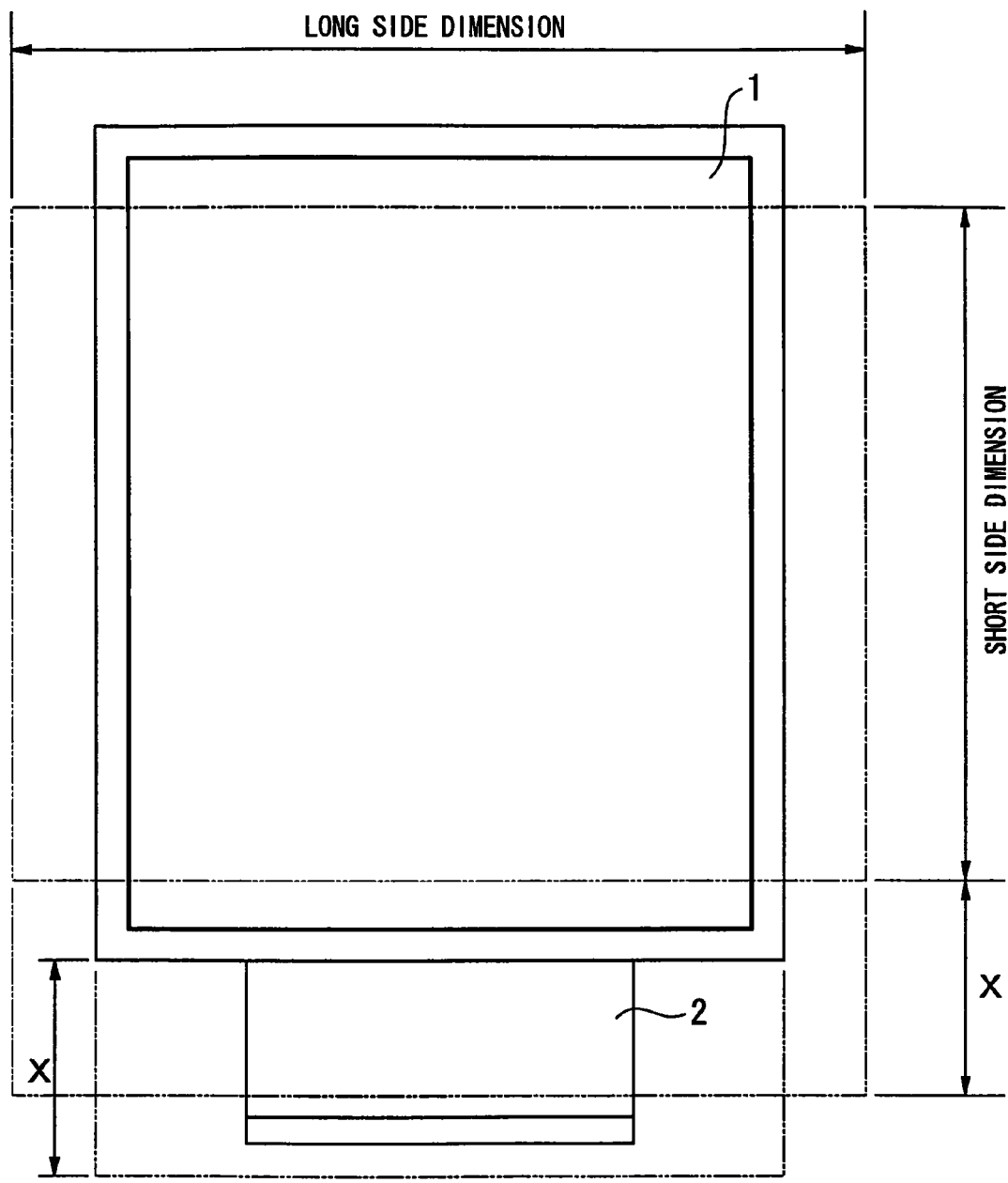
FIG. 10 shows one example of a thin-display stand of the prior art, in which a difference is explained between a lowest position in a vertical orientation and that in a horizontal orientation with regard to the thin display stand.

FIG. 9 is a perspective view of a thin-display stand of a fourth embodiment in accordance with the invention. In the embodiment, a switchover mechanism 90 includes the hold plate 18 for rotatably holding the mount axis 17 without restriction fixed on the mount plate 16 mounted on the back side of the display screen 15, a flexible joint 91 connected to the mount axis 17, and a stopper projection 91a formed at the tip of the flexible joint 91.

As in the above-mentioned embodiments, the mount plate 16 always contacts with the hold plate 18 to form a contact plane. The display screen 15 rotates by 90 degrees about the mount axis 17 in a plane parallel to the contact plane to change over between a vertical orientation and a horizontal orientation. The flexible joint 91 extends downward. The tip of the stopper projection 91a is located in a concave trough 14a in the middle of the slide member 14. In a case where the display screen 15 is in a horizontal orientation, it lies down; on the other hand, when the display screen 15 is in a vertical orientation, it stands up. There are a flexible shaft, a universal joint, and a spring as examples of the flexible joint 91, which can be used most appropriately.

When the display screen 15 of the thin display stand constructed as described above is in a horizontal orientation, it can move down to the lowest portion of the vertical position adjustment mechanism 10 because the stopper projection 91a lies down on the concave trough 14a in the middle of the slide member 14. As shown in FIG. 9, in a case where the display screen 15 is rotated by 90 degrees to be in a vertical orientation, the stopper projection 91a is also rotated by 90 degrees to be projected via the flexible joint 91. When the vertical position adjustment mechanism 10 moves downward, the stopper projection 91a hits against the upper end of the support member 13. This prevents a further downward movement. Consequently, the lower end of the longer side of the display screen 15 never strikes against the stand base or a desk.

In the embodiment, when the inside of the flexible joint 91 is made hollow, a cable can be put through inside. Moreover, a tilt of the display screen 15 can be handled.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A stand for a thin display comprising:
a vertical position adjustment mechanism for adjusting a vertical position of the thin display;
a switchover mechanism for switching over between a vertical orientation and a horizontal orientation of the thin display, the switchover mechanism being disposed at an end of the vertical position adjustment mechanism and coupled to the thin display;
a stopper for changing movement ranges of vertical adjustment of the thin display by the vertical position adjustment mechanism, the stopper being actuated between a plurality of positions by the switchover mechanism during switching; and
a gear mechanism disposed between the switchover mechanism and the stopper, the gear mechanism controlling the stopper to appear or disappear according to a rotation of the thin display.

2. A stand for a thin display as recited in claim 1, wherein the movement ranges of the vertical position adjustment mechanism are altered by the stopper that varies according to a rotational movement of the thin display.

3. A stand for a thin display comprising:
a thin display including a screen and a low depth, the screen having a long side and a short side;
a vertical position adjustment unit for adjusting a vertical position of the thin display;
a rotary switchover unit for switching over the thin display between a vertical orientation and a horizontal orientation, the vertical orientation being a position in which the long side is in a vertical direction, the horizontal orientation being a position in which the long side is in a horizontal direction, the rotary switchover unit being disposed at an end of the vertical position adjustment mechanism and coupled to the thin display;
a stop member for changing the movement ranges of vertical adjustment of the thin display by the vertical position adjustment unit, the stop member being actuated between a plurality of positions by the rotary switchover unit during switching; and
a gear mechanism disposed between the rotary switchover unit and the stop member, the gear mechanism controlling the stop member to appear or disappear according to a rotation of the thin display.

4. A stand for a thin display, comprising:
a vertical position adjustment unit for holding a thin display screen at a plurality of vertical positions based on orientation of the thin display screen;
a switchover mechanism for switching the orientation of the thin display screen between a vertical orientation and a horizontal orientation, the switchover mechanism being disposed at an end of the vertical position adjustment mechanism and coupled to the thin display screen;
a sliding stop member for restricting downward movement along the vertical position adjustment unit beyond a predefined point based on the orientation of the thin display screen, the sliding stop member being disposed at a first vertical position when the thin display screen is in a horizontal orientation and disposed at a second vertical position when the thin display screen is in a vertical orientation; and
a gear mechanism disposed between the switchover mechanism and the sliding stop member, the gear mechanism controlling the sliding stop member to appear or disappear according to a rotation of the thin display.

5. The stand for a thin display as in claim 4, wherein the switchover mechanism increases a range of movement of the vertical position adjustment unit when the thin display screen is in the horizontal orientation by disposing the sliding stop member at the first vertical position.

6. The stand for a thin display as in claim 4, wherein the switchover mechanism decreases a range of movement of the vertical position adjustment unit when the thin display screen is in the vertical orientation by disposing the sliding stop member at the second vertical position, the second vertical position being at a lower height relative to the first vertical position.

* * * * *